United States Patent
Joblin et al.

(10) Patent No.: US 11,645,631 B2
(45) Date of Patent: May 9, 2023

(54) METHOD AND SYSTEM FOR AUTOMATIC MAINTENANCE OF A MACHINE

(71) Applicant: SIEMENS AKTIENGESELLSCHAFT, Munich (DE)

(72) Inventors: Mitchell Joblin, Munich (DE); Steffen Lamparter, Feldkirchen (DE); Maja Milicic Brandt, Munich (DE); Michal Skubacz, Gröbenzell (DE); Ingo Thon, Grasbrunn (DE)

(73) Assignee: Siemens Aktiengesellschaft, Munich (DE)

(*) Notice: Subject to any disclaimer, the term of this patent is extended or adjusted under 35 U.S.C. 154(b) by 69 days.

(21) Appl. No.: 16/631,661

(22) PCT Filed: Jul. 16, 2018

(86) PCT No.: PCT/EP2018/069286
§ 371 (c)(1),
(2) Date: Jan. 16, 2020

(87) PCT Pub. No.: WO2019/016148
PCT Pub. Date: Jan. 24, 2019

(65) Prior Publication Data
US 2020/0167736 A1    May 28, 2020

(30) Foreign Application Priority Data
Jul. 18, 2017  (EP) .................................... 17181869

(51) Int. Cl.
*G06Q 10/00*    (2012.01)
*G06Q 10/20*    (2023.01)
(Continued)

(52) U.S. Cl.
CPC ............... *G06Q 10/20* (2013.01); *G06N 5/04* (2013.01); *G06N 20/00* (2019.01); *G06Q 10/1097* (2013.01)

(58) Field of Classification Search
None
See application file for complete search history.

(56) References Cited

U.S. PATENT DOCUMENTS

2005/0288819 A1* 12/2005 de Guzman ............ F16L 55/38
                                                        700/245
2008/0133178 A1*  6/2008 Byrne ................ G05B 23/0283
                                                        702/184
(Continued)

FOREIGN PATENT DOCUMENTS

CN      102185860 A    9/2011
CN      102867069 A    1/2013
(Continued)

OTHER PUBLICATIONS

"Windows Update—Wikipedia",XP055442353, retrieved from the Internet: URL:https://en.wikipedia.org/w/index.php?title=Windows Update&oldid=785725512, retrieved on Jan. 18, 2018.
(Continued)

*Primary Examiner* — Cory W Eskridge
(74) *Attorney, Agent, or Firm* — Lempia Summerfield Katz LLC

(57) ABSTRACT

A method and system for automatic maintenance of a machine (2) comprising the steps of receiving (S1) at least one maintenance relevant event (E) from a controller (3) of the machine (2); augmenting (S2) the received event (E) with the event's machine context read from a machine maintenance ontology; matching (S3) the event's machine context with maintenance rules to generate at least one maintenance task (T) comprising an associated task description; and providing (S4) a maintenance schedule for the
(Continued)

machine (2) assigning the generated maintenance task (T) to suitable maintenance executing entities (5) on the basis of the task description of the respective maintenance task (T).

19 Claims, 4 Drawing Sheets

(51) Int. Cl.
*G06N 20/00* (2019.01)
*G06N 5/04* (2023.01)
*G06Q 10/1093* (2023.01)

(56) References Cited

U.S. PATENT DOCUMENTS

| | | |
|---|---|---|
| 2011/0301992 A1 | 12/2011 | Staaf |
| 2013/0124136 A1 | 5/2013 | Neeley et al. |
| 2016/0259873 A1 | 9/2016 | Kessie et al. |
| 2017/0315831 A1 | 11/2017 | Shi |
| 2018/0121815 A1* | 5/2018 | Lamparter ............. G06N 5/022 |

FOREIGN PATENT DOCUMENTS

| | | |
|---|---|---|
| CN | 103930877 A | 7/2014 |
| CN | 105843592 A | 8/2016 |
| EP | 3065092 A1 | 9/2016 |
| WO | WO0101301 A2 | 1/2001 |
| WO | WO2016081954 A1 | 5/2016 |

OTHER PUBLICATIONS

European Search Report for European Patent Application No. 17181869.3-1222 dated Jan. 30, 2018.

PCT International Search Report and Written Opinion of International Searching Authority dated Sep. 18, 2018 corresponding to PCT International Application No. PCT/EP2018/069286 filed Jul. 16, 2018.

* cited by examiner

METHOD AND SYSTEM FOR AUTOMATIC MAINTENANCE OF A MACHINE

CROSS REFERENCE TO RELATED APPLICATIONS

This present patent document is a § 371 nationalization of PCT Application Serial Number PCT/EP2018/069286, filed Jul. 16, 2018, designating the United States, which is hereby incorporated in its entirety by reference. This patent document also claims the benefit of EP 17181869.3, filed on Jul. 18, 2017, which is also hereby incorporated in its entirety by reference.

BACKGROUND

Embodiments relate to a method and system for automatic maintenance of a machine using a decision rule engine.

BRIEF SUMMARY AND DESCRIPTION

The scope of the present invention is defined solely by the appended claims and is not affected to any degree by the statements within this summary. The present embodiments may obviate one or more of the drawbacks or limitations in the related art.

Machines become more and more complex. A machine may include software and/or hardware components with different operation lifetimes. Accordingly, it is necessary to perform maintenance activities to maintain a machine operable. Maintenance activities include, for example, a replacement of failed or worn-out components of the machine. Further, the machine may include resources that are consumed during operation of the machine. For example, a machine may include a reservoir or container for lubrication fluids that are used to lubricate components of the machine. Accordingly, the maintenance of a machine is in itself a complex process that is performed with the goal to avoid a breakdown of the machine or to prohibit a decreasing performance of the machine.

In conventional maintenance systems, maintenance is mostly performed based on fixed time intervals. For example, a specific component of the machines is maintained in a regular time interval, e.g. every week or every year. This does normally not take into account the current condition of the machine component.

FIG. 1 depicts schematically a fill level of a resource reservoir such as an oil tank used for lubricating workpieces or work components of a machine such as a tool machine for processing a workpiece. As may be seen in the example, the fill level of the lubricating fluid diminishes gradually over time during operation of the tool machine. Another hardware component of the machine such as a tool used for processing the workpiece is replaced in the example periodically at times t1, t2, t3, t4. The replacement of this hardware component of the machine forms a maintenance activity MA that may be performed by a technical operator. In the example of FIG. 1, the fill level of the lubricating oil has a characteristic curve CC. When the fill level falls beneath a threshold value TH, the reservoir of the lubricating oil has to be refilled. This forms a maintenance activity MA5 as shown in FIG. 1. In a conventional maintenance system, the operator may perform as a maintenance activity MA3 the replacement of the affected hardware component according to the periodic time schedule and leave the machine to continue its operation. However, very briefly after maintenance activity MA3 has been performed at the machine component of the machine, machine maintenance activity MA5 is required, i.e. refilling of the oil reservoir. Accordingly, the operator has to return to the machine to perform the maintenance activity MA5. Accordingly, in this conventional maintenance system, the condition or state of the oil reservoir component filled with the lubricating oil is not considered or taken into account. For example, in the simple example of FIG. 1, the conventional maintenance system does not give any indication to the technician not only to perform the maintenance activity MA3 but also the maintenance activity MA5, i.e. refilling of the oil reservoir, to avoid an unnecessary return of the operator briefly after having performed maintenance activity MA3. Accordingly, conventional maintenance systems are inefficient and time-consuming. Moreover, conventional maintenance systems or maintenance methods are error prone. Moreover, the probability of a failure or breakdown does increase. For example, if the technician in the example of FIG. 1 has left the machine after having performed maintenance activity MA3 he may not return in time to the machine to perform maintenance activity MA5. For example, if the fill level of the lubricating oil falls beneath a second threshold value where the fill level becomes critical this may trigger an automatic shutdown of the machine. Because of the suboptimal maintenance, the machine has to be shutdown reducing the production performance of the machine. Moreover, if there is no shutdown mechanism in the machine, the fill level of the lubricating oil may fall beneath the low critical threshold value leading to failure or even destruction of the machine.

DETAILED DESCRIPTION

Embodiments provide a method and system for automatic maintenance of a machine increasing the productivity or performance of the machine and increasing security and reliability of the machine.

Embodiments provide a method for automatic maintenance of a machine including the steps of: receiving at least one maintenance relevant event from a controller of the machine or generated at predetermined time intervals, augmenting the received event with the event's machine context read from a machine maintenance ontology, matching the event's machine context with maintenance rules to generate at least one maintenance task including an associated task description and providing a maintenance schedule for the machine assigning the generated maintenance task to suitable maintenance executing entities on the basis of the task description of the respective maintenance task.

In an embodiment of the method, the maintenance rules include predefined maintenance rules and/or learned maintenance rules.

In an embodiment of the method, the maintenance rules are learned or trained automatically from events having triggered at least one associated maintenance task performed by a maintenance executing entity.

In an embodiment of the method, events received from the controller of the machine and performed maintenance tasks are written into a maintenance log storing a maintenance history of the machine.

In an embodiment of the method, the task description of the generated maintenance task includes at least one maintenance task activity for performing a maintenance of a machine component of the machine, a maintenance task priority, a maintenance task capability required to perform the maintenance task activity, a list of maintenance task resources required to perform the maintenance task activity and/or a maintenance task type.

In an embodiment of the method, if no matching between the machine context and the maintenance rules is achieved, the task is recommended automatically based on the maintenance history stored in the updated maintenance log.

In an embodiment of the method, the controller of the machine controls at least one machine component of the machine that is maintained by a suitable maintenance executing entity selected according to the generated maintenance schedule.

In an embodiment of the method, available suitable maintenance executing entities with maintenance task capabilities and/or available maintenance task resources are read from a maintenance database.

In an embodiment of the method, the maintenance relevant event includes a machine disruption event indicating a disruption of at least one machine component of the machine, a machine wearout event indicating a wearout of at least one machine component of the machine and/or a time-triggered maintenance event.

In an embodiment of the method, an event is generated by the controller by evaluating sensor data from sensors monitoring a behavior and/or operation state of machine components of the machine.

In an embodiment of the method, the generated maintenance relevant event includes a time stamp and machine component indicators indicating affected machine components affected by the reported event.

In an embodiment of the method, a maintenance task performed by a maintenance executing entity at a machine component of the machine is reported and written into the maintenance log to update the maintenance history of the machine.

In an of the method, the maintenance executing entity includes maintenance components integrated or attached to the machine.

In an embodiment of the method, the maintenance executing entity includes a mobile maintenance executing entity moved to the machine according to the generated maintenance schedule.

Embodiments further provide a maintenance system for automatic maintenance for automatic maintenance of at least one monitored machine having a controller that controls machine components of the machine.

The maintenance system includes an event interface for receiving maintenance relevant events concerning affected machine components of the machine from the controller of the at least one monitored machine, a processing unit configured to augment the received event with the event's machine context read from a machine maintenance ontology stored in a memory and configured to match the event's machine context with predefined and/or learned maintenance rules for generating at least one maintenance task including an associated task description used for calculating a maintenance schedule for the respective machine and a control interface for controlling maintenance executing entities depending on the calculated maintenance schedule of the machine to perform maintenance of affected machine components of said machine.

Embodiments further provide a machine including machine components controlled by a controller of the machine. The machine includes an interface used to notify maintenance relevant events concerning affected machine components of the machine generated by the controller to the maintenance system.

DETAILED DESCRIPTION

Figure 1:
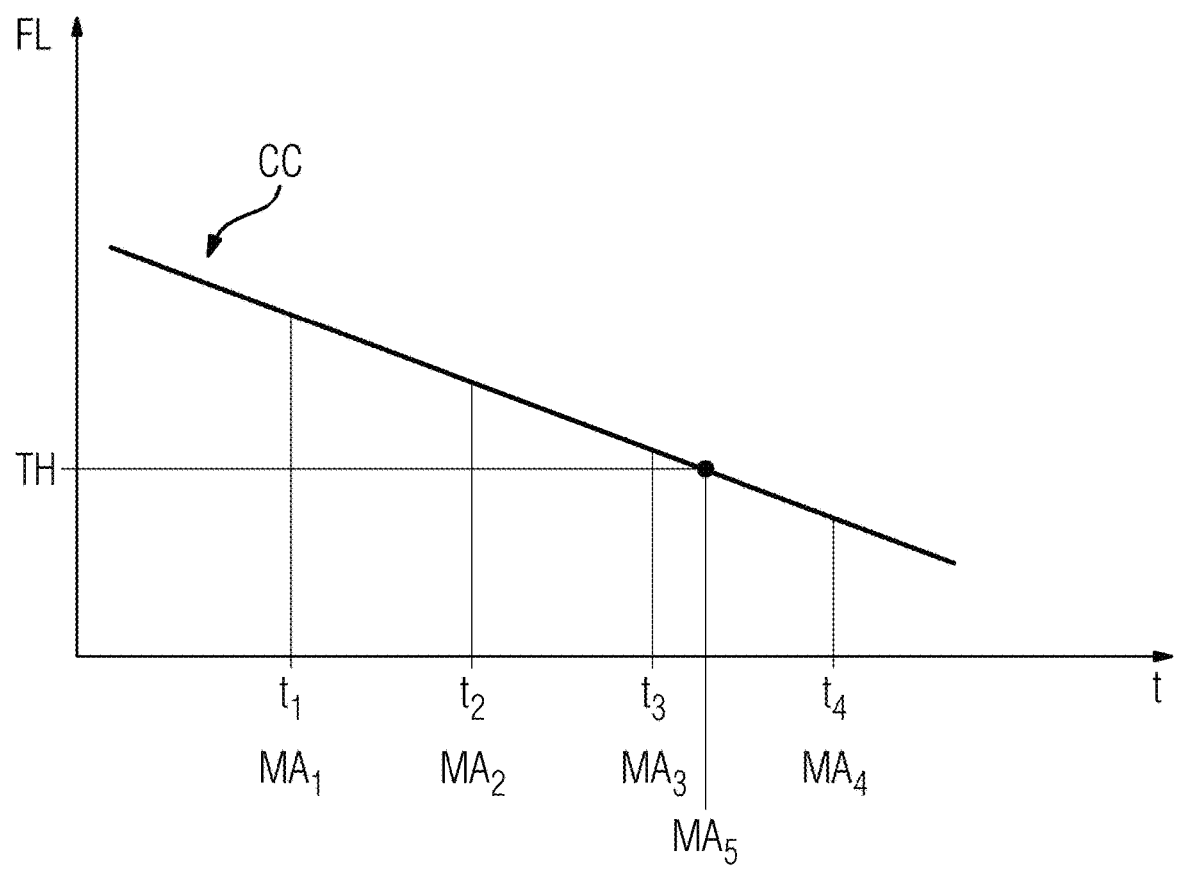
FIG. 1 depicts a schematic diagram illustrating a known problem.
Figure 2:
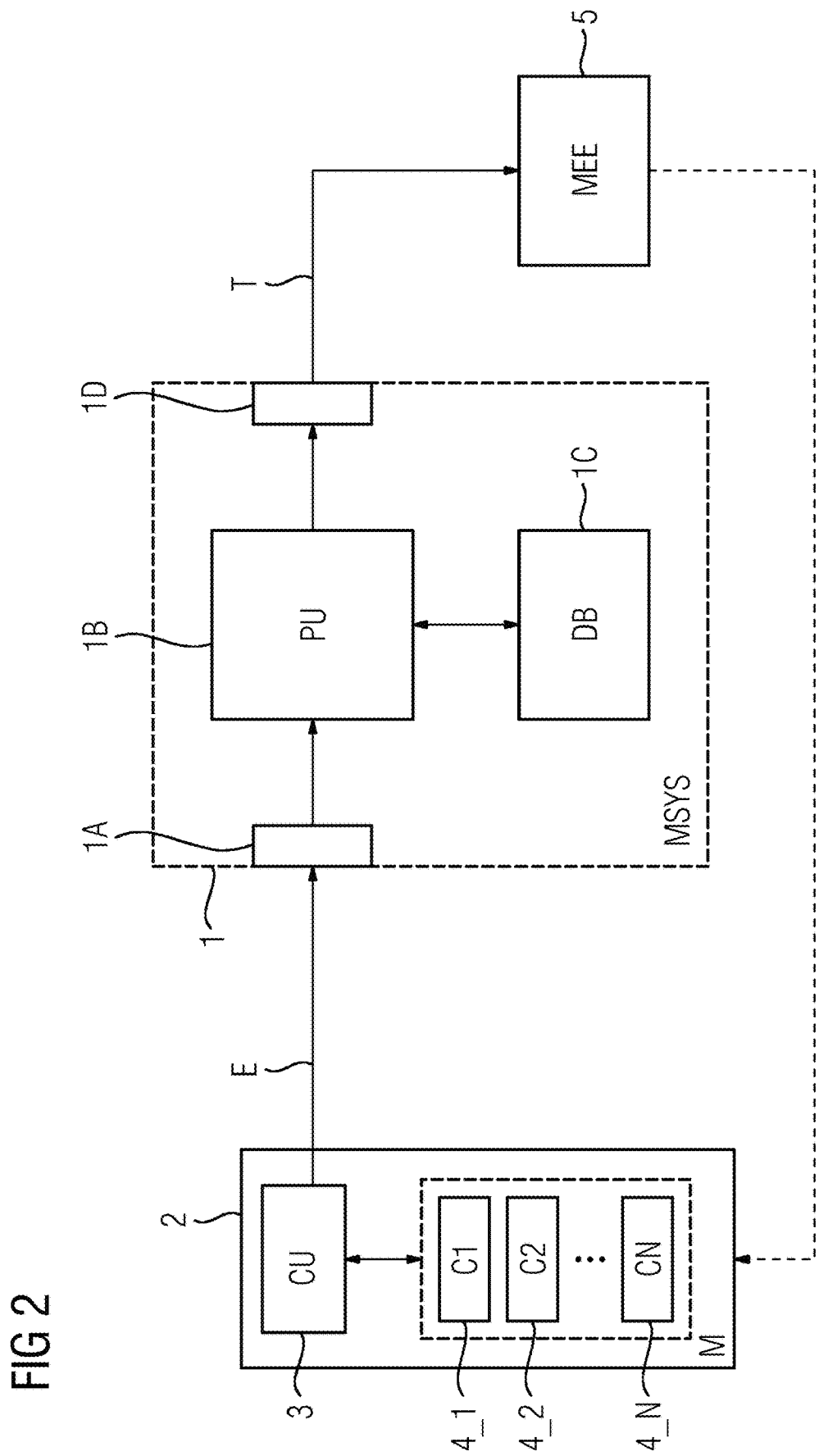
FIG. 2 depicts a block diagram of an example of a maintenance system according to an embodiment.

FIG. 2 includes a machine maintenance system 1 that is used for performing automatically maintenance of at least one monitored machine 2 as depicted in FIG. 2. The machine 2 includes a controller 3 configured to control several components 4-1, 4-2, . . . 4-$n$ of the machine 2. The components 4-$i$ may include software and/or hardware components. The number of components controlled by the controller 3 may vary depending on the complexity of the machine. The components 4-$i$ may interact during operation of the machine 2. The machine 2 may also include sensors (not illustrated in FIG. 2) that may monitor a current state or behavior of different components of the machine. The sensors may supply the controller 3 with information reflecting the current state of the machine components 4-$i$. For example, a sensor may provide the controller 3 with a fill level of a lubrication chemical component within a reservoir as illustrated in FIG. 1. The controller 3 may generate automatically events on the basis of the received information and sensor data, for example, the controller 3 may in the simple example of FIG. 1 generate an alarm event, if the fill level falls beneath a threshold level. If this maintenance relevant event occurs the controller 3 may send this maintenance relevant event E via a signal line or a network to an event input interface 1A of the maintenance system 1 as shown in FIG. 2. The maintenance interface 1A receives in a possible embodiment a stream of events E from one or several different machines 2. The event instances E may include time stamps TS and/or machine indicators MID indicating a data source having generated the respective event example E.

In a possible embodiment events, E, are automatically generated in predetermined time intervals.

The maintenance system 1 includes a processing unit 1B including at least one processor or microprocessor. The processing unit 1B is configured to augment the received event E with the event's machine context that may be read in a possible embodiment from a machine maintenance ontology stored in a database 1C as shown in FIG. 2. The received event E is automatically augmented with the event's machine context read from the machine maintenance ontology by the processing unit 1B. The event's machine context is then matched with maintenance rules to generate automatically at least one maintenance task T including an associated task description. This task description is then used for calculating a maintenance schedule for the machine 2. The processing unit 1B provides a maintenance schedule for the machine 2 assigning the generated maintenance task T to suitable maintenance executing entities 5 on the basis of the task description of the respective maintenance task T. The processing unit 1B may have access to a maintenance model MM as illustrated in the schematic diagram of FIG. 4. This maintenance model MM may also be stored in the database 1C of the maintenance system 1. The maintenance system 1 includes a control interface 1D for controlling maintenance executing entities 5 according to the calculated maintenance schedule to perform maintenance activities at affected machine components 4-$i$ of the machine 2.

In an embodiment, the events or event instances E received from the controller 3 of the machine 2 as well as the maintenance task T performed by the maintenance executing entities 5 are both written into a maintenance log storing a maintenance history of the respective machine 2. In an embodiment, the maintenance log may be stored in a local memory of the machine 2 and read out by the maintenance system 1 via a data interface. In an embodiment, the maintenance log storing the maintenance history of the machine 2 may also be stored in the database 1C of the maintenance system 1. In an embodiment, the maintenance executing entity 5 having performed the maintenance task T may report the executed maintenance task T to the maintenance system 1 that writes the executed or performed maintenance task T into the maintenance log of the respective machine 2.

The maintenance executing entity 5 may include in a possible embodiment a mobile maintenance executing entity 5 that may be moved to the machine 2 under control of the processing unit 1B according to the calculated maintenance schedule. For example, a mobile maintenance executing entity 5 may include a robot including one or several maintenance tools for performing the required maintenance activities. The maintenance executing entity 5 may include an external entity as depicted in FIG. 2 but also an integrated or attached maintenance component located at the machine 2. In a possible implementation, a maintenance component may also form part of the machine 2 and may be attached to the machine 2. In this embodiment, the maintenance component may perform the required maintenance activity under control of the maintenance system 1 receiving control signals via the control interface 1D from the processing unit 1B. The control signals may be sent to the machine 2 via a wired or wireless communication interface. In an embodiment, the maintenance executing entity 5 is formed by a technician having the required maintenance skills to perform the required maintenance activity at the specific affected machine component 4-i. In a possible embodiment, the technician may be directed to the machine 2 and the affected machine component 4-i under control of the processing unit 1B. In an embodiment, the processing unit 1B includes access to geographic data or components indicating a position or location of a machine 2 and/or its components 4-i.

The processing unit 1B of the maintenance system 1 augments the received event E with the event's machine context read from a machine maintenance ontology stored in the database 1C. The event's machine context is matched with maintenance rules to generate the at least one maintenance task T including an associated task description. The task description of the generated maintenance task may include in an embodiment at least one maintenance task activity describing the activity for performing the respective maintenance task at a machine component 4-i of the machine 2. The maintenance task description may further include in an embodiment a maintenance task priority indicating the urgency of the respective maintenance activity and/or an end date until the maintenance task has to be fulfilled. In an embodiment, the task description of the generated maintenance task further includes a maintenance task capability required to perform the maintenance task activity. This maintenance task capability may for example indicate a technician role of the technician forming a maintenance executing entity 5 to perform the required maintenance task. The task description may further include a list of maintenance task resources required to perform the maintenance task activity. For example, the maintenance task description may include a list of spare parts required to perform the maintenance task activity. The task description of the generated maintenance task may further include a maintenance task type indicating the type of the maintenance task activity, e.g. a repair maintenance task or a replacement of a component of the machine. When receiving an event E from the controller 3 of the machine 2, the event's machine context is matched automatically with maintenance rules to generate the maintenance task T including the associated task description. The maintenance rules may include predefined maintenance rules and/or learned maintenance rules. In an embodiment, the maintenance rules are learned or trained automatically from events E of the past having triggered at least one associated maintenance task T performed or executed by a maintenance executing entity 5 and stored in the maintenance history of the respective machine 2. The maintenance rules may be learned during operation of the machine 2. Alternatively, the maintenance rules may also be trained on the basis of a dataset before starting operation of the machine 2. If no matching between the machine context and maintenance rules is achieved, the task is recommended automatically in a possible embodiment based on the maintenance history stored in the updated maintenance log of the machine 2.

In an embodiment, a central maintenance system 1 is provided for a plurality of machines 2, for example, production machines of a production facility that may be connected via a bus system to the processing unit 1B of the maintenance system 1. The production facility may include a plurality of different maintenance executing entities 5 that are controlled by the maintenance system 1 according to the calculated maintenance schedule. Embodiments also provides production facility including a plurality of different machines 2 each maintained under control of a maintenance system 1 as illustrated in FIG. 2.

Figure 3:
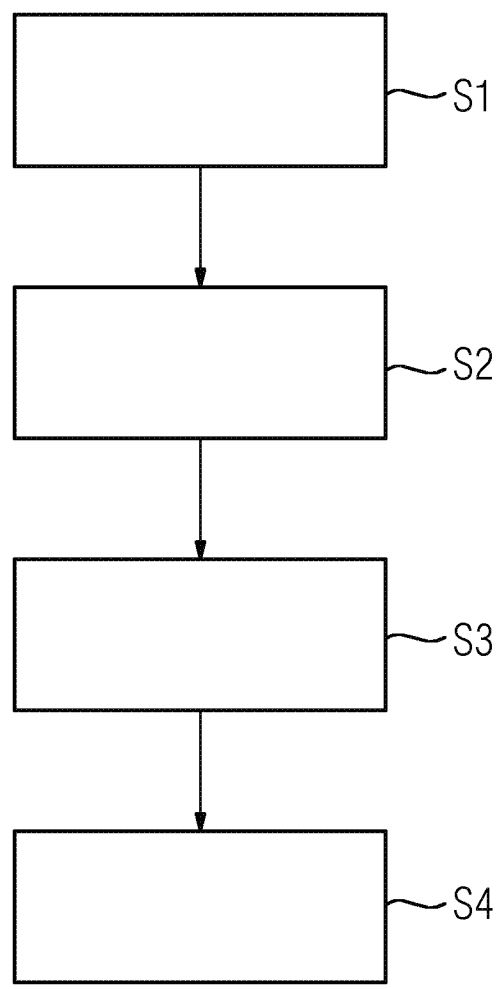
FIG. 3 depicts a flowchart of a method for automatic maintenance of a machine according to an embodiment.

FIG. 3 depicts a flowchart of an embodiment of a method for automatic maintenance of a machine 2.

The method includes several steps. In a first step S1, at least one maintenance relevant event E is received from a controller 3 of a machine 2, for example, a production machine of a production facility.

In a step S2, the received event E is augmented with the event's machine context read from a machine maintenance ontology stored in a database.

In a step S3, the event's machine context is matched with maintenance rules to generate at least one maintenance task T including an associated task description. The task description of the generated maintenance task T may include in a possible embodiment at least one maintenance task activity, a maintenance task priority, a maintenance task capability, a list of maintenance task resources, and a maintenance task type.

In a step S4, a maintenance task schedule T-SCH is provided and/or calculated for the machine 2 and the generated maintenance task is assigned according to the generated maintenance schedule to suitable maintenance executing entities 5 on the basis of the task description of the respective maintenance task T.

Figure 4:
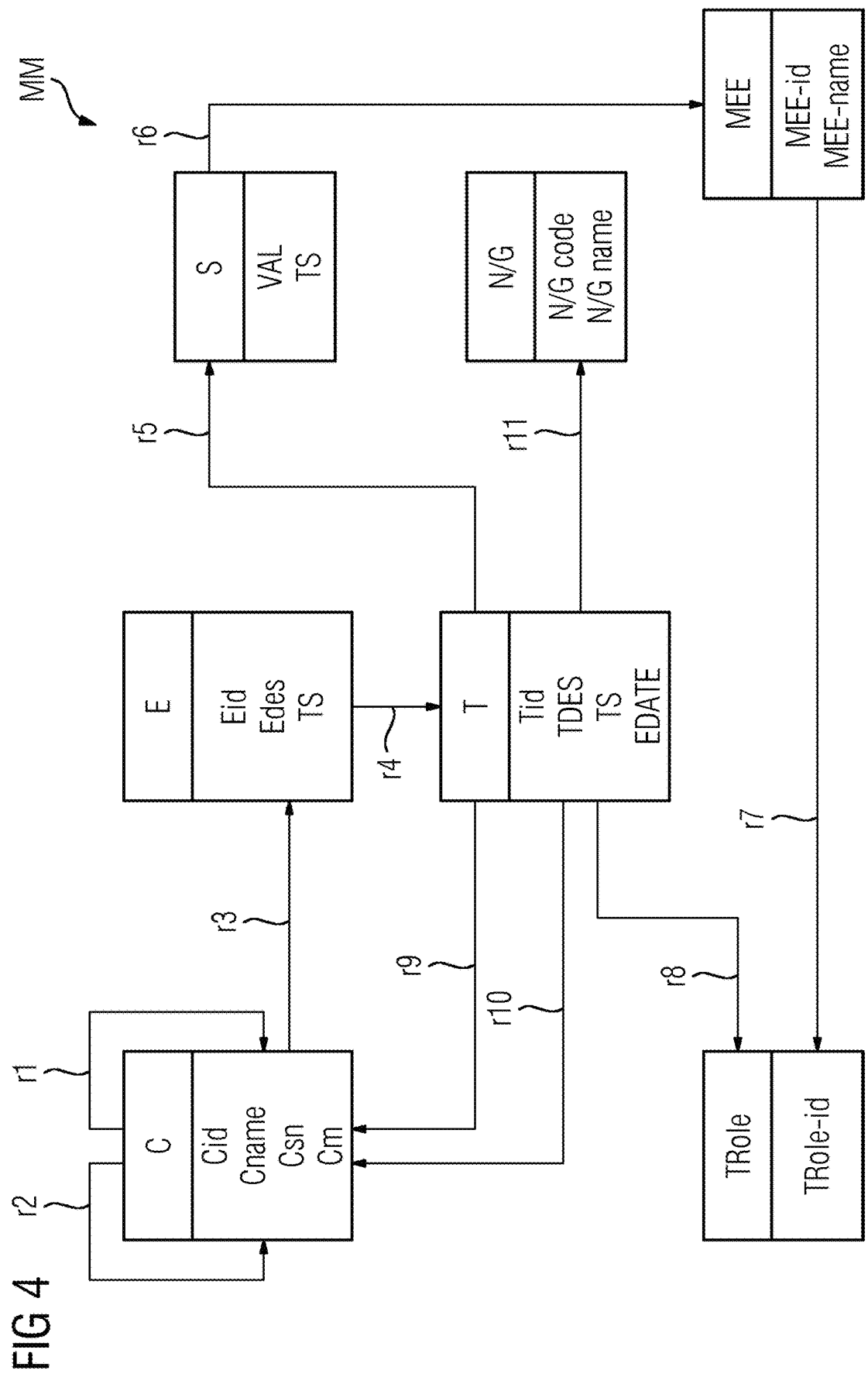
FIG. 4 depicts schematically a maintenance model used by the method and system for achieving an automatic maintenance of a machine according to an embodiment.

FIG. 4 depicts schematically a maintenance model MM that may be used by the maintenance system 1 for providing an automatic maintenance of a machine 2. The maintenance model MM depicted in FIG. 4 forms a knowledge base that allows mapping received events E to corresponding tasks T. In the maintenance model MM, there are several data objects including component C that form an asset of the machine 2. The component data object C includes a component object Cid, a component object name Cname, a serial number Csn and the component manufacturer Cm. A component C may be connected to another component (relation r1). Further, a component C may form part of another component (relation r2). The component C forming an object of the maintenance model MM is configured to generate (relation r3) events E. Each event object E includes an event identifier Eid, an event description Edes as well as a time stamp TS indicating the time when the event E has occurred or has been generated. The event E may activate or trigger (relation r4) a task T. The task data object T of the maintenance model MM depicted in FIG. 4 includes a task ID, a task description Tdes, a task time stamp TS and an end date when the task T has to be fulfilled. Each task object may have (relation r5) a status S. The status indicates a status of the task T and may include a value VAL as well as a time stamp TS. The task status S may be fulfilled by (relation r6) a maintenance executing entity 5 such as a robotic unit or a technician. The maintenance executing entity 5 may include an identifier MEE-id as well as a name MEE-name. The machine executing entity 5 includes a role TRule or a capability (relation r7) for executing a task T. The task role or capability may include an identifier TRule-id. The task T requires for its fulfillment a capability or a role as depicted in the meta model of FIG. 4 (relation r8). The task T may have an effect (relation r9) on an asset or component C of the machine 2. Further, the task T may require (relation HO) resources such as spare parts for performing the task T. In an embodiment, the task T has to be fulfilled according to a predefined norm or guidance N/G (relation r11) as illustrated in FIG. 4 having a code N/G code and a name N/G name.

The upper maintenance model MM defines:

Machine component classes (types) and their hierarchy: E.g.

---
LinearAxis
subClassOf Axis
subclassOf Machine_Component
---

Maintenance event classes (types) and their hierarchy E.g.

---
Inspection_Due
subclassOf
Maintenance_Event
---

Moreover, it defines types of Maintenance tasks T (such as Inspect, Repair, Refill, etc), technician roles TRole (such as Electrician, Mechanic, Operator, . . . ) etc.

The machine-specific model defines the instances of the components of a specific machine, e.g.

---
X-axis type LinearAxis
Z-axis type LinearAxis
---

By a maintenance rule it may be specified that, whenever an axis generates an event E of type Inspection_Due, a task of type Inspect requiring a MaintenanceMechanic has to be performed on that axis within the next 240 hours. Formally, the rule looks as follows:

---
(?A generatesEvent ?E), (?A type Axis), (?E type Inspection_Due)
–>
(?E activates ?T), (?T type Inspect), (?T affectsAsset ?A), (?T description 'Check if backlash-free. Re-adjust if necessary'), (?T done-within-hours '240'), (?T requiresRole MaintenanceMechanic)
---

Under the assumption that axis inspection has to be done every 1250 operational hours, this means that X-axis and Z-axis will generate events of type Inspection_Due every 1250 operational hours.

For example, the X-axis may generate an example e_123 of type Inspection_Due.

By matching the event description against the model (upper+machine-specific), the system knows that X-axis is of type LinearAxis and thus also of type Axis. This means that X-axis may be matched against the variable ?A, and e_123 may be matched against the variable ?E in the rule above. Thus, the rule is triggered and a new task example as described by the maintenance rule is automatically generated.

The maintenance rules are learned or trained automatically from pairs of events, E, and associated maintenance task, T, performed by the maintenance executing entity 5.

The maintenance model MM depicted in FIG. 4 may vary according to the use case. Besides the knowledge base depicted in FIG. 4, the processing unit 1B of the maintenance system 1 may include access to additional information, for example, the maintenance log storing the maintenance history of the machine 2 including events E and task instances T. Further, the processing unit 1B may include access to a machine configuration of the machine 2 including the different hardware and software components 4-$i$ of the machine 2 as well as their interconnections and interdependencies. Further, the processing unit 1B may include access to a list of resources required for performing the maintenance, e.g. a spare part list. Moreover, the processing unit 1B may include access to predefined norms required for performing the maintenance task T.

The maintenance system 1 takes into account the current machine condition of the machine 2 and is not exclusively based on fixed time maintenance intervals. Accordingly, the maintenance method may be performed very accurately in a short time avoiding maintenance errors. The maintenance system 1 increases the maintenance performance and may reduce resource consumption, for example, spare part consumption. Moreover, maintenance tasks T may be bundled in time and/or at a MEE 5 so that maintenance work is aggregated and performed more efficiently. Moreover, the maintenance documentation is also performed automatically in an embodiment. In an embodiment, each machine maintenance report may be generated automatically when the maintenance task T has been accomplished or fulfilled by the maintenance executing entity 5. The generated maintenance report may also be stored in the database 1C of the maintenance system 1. The method provides for a predefined machine maintenance, a machine disruption maintenance, or a condition-based maintenance. For performing predefined machine maintenance, predefined machine maintenance rules may be stored in a memory. For machine disruption maintenance, machine disruption may be signaled via a disruption indicator (alarm or physical event) requiring a machine executing entity 5 to inspect the respective machine. In an embodiment, the maintenance log storing the maintenance history may be synchronized with the analytical processing unit 1B of the maintenance system 1. In this embodiment, an operator or maintenance executing entity 5 has a quick insight into the stored maintenance history of the machine 2 that may help to choose a suitable maintenance task and maintenance capability. In an embodiment, an operator or technician may fill in a repair or maintenance report using a smart pen of a mobile device for reporting the performed maintenance task to the system 1 that provides an automatic transfer of the maintenance report into the maintenance log of the system 1. In an embodiment, the maintenance task T may be generated automatically by a decision rule engine. Rule bodies such as a decision rule engine may include usage-based maintenance messages (such as refill oil every 30 machine production hours), output of condition monitoring applications, or output of additional sensors. For example, an application may monitor a spindle state of a spindle or other component C of a machine 2 based on the output of sensor data including temperature, position or torque sensors attached to the spindle component. Further, additional sensors may include a pressure sensor indicating a required exchange of a filter of a filter system. The rule heads may include task descriptions. With the method and apparatus, conventional time-based maintenance tasks are replaced by more appropriate usage- and condition-based maintenance tasks. Consequently, the time-based maintenance tasks of a conventional system may be replaced by a smaller number of maintenance tasks generated by the maintenance system 1. With the method and system 1, a condition-based maintenance leads to an improved efficiency of the maintenance itself but also to an increased performance of the machine 2 or facility. Further, the maintenance process may be performed faster. The maintenance system 1 may even provide legal compliance with norms or guidance forming data objects of the maintenance model MM as depicted in FIG. 4. The maintenance rules implemented in the maintenance system 1 may be preconfigured maintenance rules provided by the OEM. The maintenance system 1 may in a possible implementation be connected to other systems such as an SAP system. The task generation is performed condition-based dynamically using autotext augmentation. In an embodiment, the method and system may provide for a fully digital documentation process and further may provide for an automated service provider selection of service providers that provide maintenance services. Based on task priorities, required maintenance capabilities as well as on other factors such as available maintenance resources and/or resource prices as well as availability of service providers, task orders may be automatically scheduled and allocated automatically in a cost-efficient way.

Further embodiments are possible. In an embodiment, the maintenance system 1 is integrated in the machine 2 for performing automatically maintenance operations. In this embodiment, one or several integrated or attached maintenance executing entities 5 may also be integrated or attached to the machine 2. In this embodiment, the machine 2 is capable to perform an automatic maintenance in a stand-alone operation mode without requiring external maintenance. In this embodiment, maintenance resources have to be provided for the maintenance process. In this embodiment, the maintenance executing entity 5 forms itself a component of the machine 2.

In an embodiment, a neural network NN may be used for learning the machine rules on the basis of a received training dataset including events and tasks. In an embodiment, the internal condition having triggered the event is displayed to an operator via a user interface. In an embodiment, the calculated maintenance schedule for the machine maintenance may also be output or displayed to a technician or operator of the system 1. In an embodiment, the maintenance history of the different machines 2 may be read from the database of the system 1 and displayed to the operator via a graphical user interface. In an embodiment, the predefined maintenance rules and/or learned maintenance rules may be displayed in an editable form to a technician or user. In an embodiment, a user or technician or operator of the system may also input maintenance rules via a user interface. In an embodiment, predefined maintenance rules may also be stored in a local memory of the machine 2 and read from the maintenance system 1 via an interface. In an embodiment, the machine 2 may include a local memory such as a memory stick for storing maintenance rules and/or storing a maintenance log for the machine 2. The maintenance system 1 may read out the data from the local memory of the machine 2. Also, the machine executing entity 5 may include in a possible implementation a local memory for storing the received tasks or task orders from the maintenance system 1 and for storing the task T executed or performed by the maintenance executing entity 5 for one or several machines 2 at different times. The memory content of the local memory of the maintenance executing entity 5 may also be transferred to the central database 1C of the maintenance system 1 upon request. In a possible implementation, the maintenance technician or robotic MEE 5 may carry a communication device having an interface receiving the order task according to the maintenance schedule from the processing unit 1B and move automatically or under control of a navigation system to the affected machine 2 for performing the requested maintenance task T. After accomplishing the task T, the operator or MEE 5 may report the fulfillment of the task T back to the maintenance system 1 using the communication device. In a possible implementation, the MEE 5 may only report whether it has fulfilled the required maintenance task T successfully or not. In another implementation, the MEE 5 may report to the maintenance system 1 additional parameters. For example, the MEE 5 may indicate that it has filled up the oil reservoir completely or only to a certain extent or level because it had not sufficient available maintenance resources such as lubrication oil.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that the dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for automatic maintenance of a machine the method comprising:
   receiving at least one maintenance relevant event from a controller of the machine or generated in predetermined time intervals;
   augmenting the event with information related to the machine's context read from a machine maintenance ontology that defines a machine configuration of the machine including different hardware and software components of the machine as well as interconnections and interdependencies;
   matching, subsequent to receiving the event, the augmented event with maintenance rules to generate at least one maintenance task comprising an associated task description, wherein the maintenance rules include at least some rules that are learned automatically from events and associated maintenance tasks using a neural network;
providing a maintenance schedule for the machine assigning the generated maintenance task to suitable maintenance executing entities on the basis of the associated task description of the respective maintenance task; and
performing automatically by a robotic maintenance executing entity, the generated maintenance task on the machine.

2. The method of claim 1, wherein the maintenance rules comprise predefined maintenance rules and learned maintenance rules.

3. The method of claim 2, wherein the maintenance rules are learned or trained automatically from pairs of events and associated maintenance task performed by a maintenance executing entity.

4. The method of claim 1, wherein events received from the controller of the machine and performed maintenance tasks are written into a maintenance log storing a maintenance history of the machine.

5. The method of claim 4, wherein the task description of the generated maintenance task comprises:
at least one maintenance task activity for performing a maintenance of a machine component of the machine,
a maintenance task priority,
a maintenance task capability required to perform the respective maintenance task activity,
a list of maintenance task resources required to perform the maintenance task activity and
a maintenance task type.

6. The method of claim 4, wherein if no matching between the machine context and the maintenance rules is achieved, the at least one maintenance task is recommended automatically based on data stored in the maintenance log.

7. The method of claim 1, wherein the controller controls at least one machine component of the machine which is maintained by a suitable maintenance executing entity selected according to the maintenance schedule.

8. The method of claim 1, wherein available suitable maintenance executing entities with maintenance task capabilities, available maintenance task resources, or maintenance task capabilities and available maintenance task resources are read from a maintenance database.

9. The method of claim 1, wherein the maintenance relevant event comprises at least one of:
a machine disruption event indicating a disruption of at least one machine component of the machine,
a machine wear-out event indicating a wear-out of at least one machine component of the machine, or
a time-triggered maintenance event.

10. The method of claim 1, wherein an event is generated by the controller of the machine by evaluating sensor data from sensors monitoring a behaviour, operation state of machine components, or behaviour and the operation state of machine components of the machine.

11. The method of claim 1, wherein the generated maintenance relevant event comprises a time stamp and machine component indicators indicating machine components affected by the respective event.

12. The method of claim 1, wherein a maintenance task performed by a maintenance executing entity at a machine component of the machine is reported and written into a maintenance log to update a maintenance history of the machine.

13. The method of claim 12, wherein the robotic maintenance executing entity further comprises maintenance components integrated or attached to the machine or a mobile maintenance executing entity moved to the machine according to the maintenance schedule.

14. A maintenance system for automatic maintenance of at least one monitored machine including a controller that controls machine components of the at least one monitored machine,
the maintenance system comprising:
an event interface configured to receive maintenance relevant events concerning affected machine components of the at least one monitored machine from the controller of the at least one monitored machine or generated at predefined time intervals;
a processing unit including at least one processor, the processing unit configured to augment the received event with the event's machine context read from a machine maintenance ontology stored in a memory, where the machine maintenance ontology defines a machine configuration of the machine including different hardware and software components of the machine as well as interconnections and interdependencies, and to match the event's machine context with predefined maintenance rules and learned maintenance rules for generating at least one maintenance task comprising an associated task description used for calculating a maintenance schedule for the respective machine, wherein the learned maintenance tasks are automatically learned by a neural network from past events and associated maintenance tasks; and
a control interface configured to control one or more robotic maintenance executing entities depending on a calculated maintenance schedule of the at least one monitored machine to perform maintenance of affected machine components of the at least one monitored machine; and
the one or more robotic maintenance executing entities configured to automatically perform maintenance of affected machine components of the machine.

15. A machine comprising machine components controlled by a controller of the machine, the machine comprising:
an interface configured to notify maintenance relevant events concerning affected machine components of the machine generated by the controller of a maintenance system comprising:
an event interface configured to receive maintenance relevant events concerning affected machine components of the machine from the controller or generated at predefined time intervals;
a processing unit including at least one processor, the processing unit configured to augment the received event with the event's machine context read from a machine maintenance ontology stored in a memory, where the machine maintenance ontology defines a machine configuration of the machine including different hardware and software components of the machine as well as interconnections and interdependencies, and to match the event's machine context with predefined maintenance rules and learned maintenance rules for generating at least one maintenance task comprising an associated task description used for calculating a maintenance schedule for the respective machine, wherein the learned maintenance rules are learned automatically by a neural network from past events having triggered at least one associated maintenance task performed or executed by a maintenance executing entity and stored in the maintenance history of the respective machine;
a control interface configured to control one or more maintenance executing entities depending on a calculated maintenance schedule of the machine to perform maintenance of affected machine components of the machine; and
the one or more maintenance executing entities configured to automatically perform maintenance of affected machine components of the machine.

16. The maintenance system of claim 14, wherein the maintenance rules are learned or trained automatically from pairs of events and associated maintenance task performed by a maintenance executing entity.

17. The maintenance system of claim 14, wherein events received from the controller of the machine and performed maintenance tasks are written into a maintenance log storing a maintenance history of the machine.

18. The maintenance system of claim 14, wherein the task description of the generated maintenance task comprises:
at least one maintenance task activity for performing a maintenance of a machine component of the machine,
a maintenance task priority,
a maintenance task capability required to perform the respective maintenance task activity,
a list of maintenance task resources required to perform the maintenance task activity and
a maintenance task type.

19. The maintenance system of claim 14, wherein if no matching between the machine context and the maintenance rules is achieved, the at least one maintenance task is recommended automatically based on data stored in the maintenance log.

* * * * *